(12) United States Patent
Tonello

(10) Patent No.: US 6,480,552 B1
(45) Date of Patent: Nov. 12, 2002

(54) SOFT OUTPUT METRICS GENERATION FOR SYMBOL DETECTORS

(75) Inventor: Andrea M. Tonello, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/275,147

(22) Filed: Mar. 24, 1999

(51) Int. Cl.[7] .............................. H04L 23/02; H04L 5/12
(52) U.S. Cl. ......................................... 375/265; 375/341
(58) Field of Search ................................ 375/262, 265, 375/341; 714/794, 795, 796

(56) References Cited

U.S. PATENT DOCUMENTS

| 4,945,549 A | | 7/1990 | Simon et al. | |
| 5,481,572 A | * | 1/1996 | Skold et al. | 375/347 |
| 5,838,742 A | | 11/1998 | Abu-Dayya et al. | |
| 5,867,538 A | | 2/1999 | Liu | |

FOREIGN PATENT DOCUMENTS

| DE | 0 449 327 A2 | 10/1991 | ............ H04B/7/08 |
| DE | 0 840 483 A2 | 10/1997 | ............ H04L/25/06 |
| WO | 97/24850 | * 7/1997 | |

OTHER PUBLICATIONS

A.M. Tonello, "Iterative MAP detection of coded M–DPSK signals in fading channels with application to IS–136 TDMA," VTC 1999–Fall. IEEE VTS 50th Vehicular Technology Conference, Amsterdam, pp. 1615–1619 vol. 3, XP002142138.

* cited by examiner

Primary Examiner—Chi Pham
Assistant Examiner—Phuong Phu
(74) Attorney, Agent, or Firm—Mendelsohn and Associates, PC

(57) ABSTRACT

A method for calculating soft outputs of a detector used in a receiver that is part of a communication system having either memory introducing modulators or memoryless modulators. The output of a soft output detector, also known as reliability information, provides a probability that a certain symbol was transmitted by a transmitter of the communication system or the probability that a bit within a transmitted symbol was transmitted by a transmitter.

20 Claims, 5 Drawing Sheets

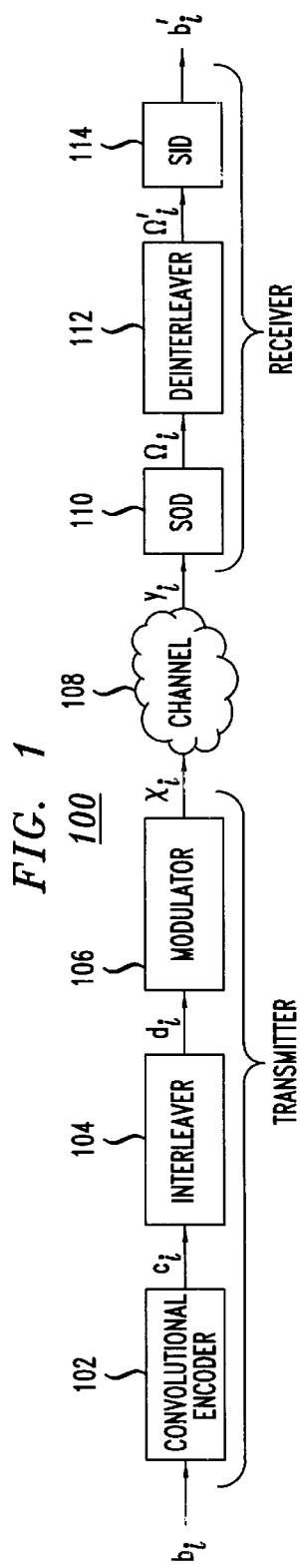

SOFT OUTPUT METRICS GENERATION FOR SYMBOL DETECTORS

BACKGROUND OF THE INVENTION

1. Field of the Invention

The present invention is directed to a method for generating and calculating reliability information with the use of a symbol detector used in a receiver for a digital communication system.

2. Description of the Related Art

Digital telecommunication systems convey digital information (i.e., bits or groups of bits) over various types of communication channels such as air, coaxial cables, telephone lines, fiber optic lines or any other well known medium through which communication signals propagate. The digital information is transmitted and received with the use of well known standard transmitter and receiver equipment. FIG. 1 depicts a model of a typical digital communication system comprising a transmitter connected to a receiver via a communication channel. The transmitter comprises convolutional encoder 102 coupled to Interleaver 104 which is coupled to modulator 106. The input signal $b_i$ is typically a string or a group of bits (e.g., 0,1) arranged in any well known format. The digital bits represent any type of signals (digital or analog) originating from any well known communication equipment. For example, the input signal can represent digitized voice, digitized video signal or digital signals from a personal computer (PC) or computer system. Although not shown, it should be understood that the transmitter also comprises circuitry (e.g., Analog to Digital Converter) that converts analog signals to bits. Further, the transmitter comprises well known radio or other transmission circuitry configured to transmit digitally modulated signals which appear at the output of modulator 106.

Modulator 106 is designed to digitally modulate signals with the use of well known spectrally efficient modulation techniques such as Phase Shift Keying (PSK) or Differential Phase Shift Keying (DPSK). Generally, modulator 106 is an M-PSK or M-DPSK modulator where M represents the total number of different groupings of bits that can be transmitted by a digital modulator. For example for M=8, each grouping of bits contains N bits where N=$\log_2$ M. Thus, for M=8, N is equal to 3. The modulation process maps the incoming bits $d_i$ (i=0, . . . , $N_d$–1; where $N_d$ is the number of bits in the sequence) into symbols (e.g., an M-PSK signal); one well known mapping technique is called Gray mapping which is shown in FIG. 2 for M=2, 4, 8. The symbols $x_i$ (i=0, . . . , $N_k$–1; where $N_k$ is the number of symbols in the sequence) are simply digital signals modulated in conformance with a particular modulation scheme (e.g., PSK). M-PSK and M-DPSK are examples of constant envelope modulation techniques because the maximum amplitude values of signals used to generate the symbols are relatively constant. When the maximum amplitude values of the signals used to generate the symbols are not constant, the modulation is referred herein as nonconstant envelope modulation. The output of modulator 106 (i.e., symbols $x_i$) is then transmitted through channel 108 with the use of the aforementioned radio transmission circuitry. The incoming bits to modulator 106 are the output of interleaver 104 whose input signal is $c_i$ (i=0, . . . , $N_c$–1; where $N_c$ is the number of bits in the sequence). The signal $c_i$ is a string or a grouping of bits, each of which is commonly referred to as a codeword, appearing at the output of convolutional encoder 102.

Convolutional encoder 102 is a well known bit processing device and/or function which, in essence, adds bits to the incoming bit stream $b_i$ (i=0, . . . , $N_b$–1; where $N_b$ is the number of bits in the sequence) to introduce redundancy in the incoming bits stream thus allowing for error correction at the receiver. The convolutionally encoded bits are represented by bit stream $c_i$ which is interleaved by interleaver 104. Interleaver 104 is also a well known bit processing device and/or function that alters the time order of the bits represented by $c_i$ thus introducing time diversity in a bit stream without adding bits to the bit stream. Although convolutional encoder 102, interleaver 104 and modulator 106 are described and depicted as separate devices, they can also be different parts of a signal processing and/or computer based system.

The receiver of the communication system model comprises a device hereinafter be referred to as Soft Output Detector (SOD) 110. The receiver further comprises Deinterleaver 112 and another device hereinafter referred to as Soft Input Decoder (SID) 114. SOD 110 is coupled to Deinterleaver 112 which is coupled to SID 114. It will be readily understood that the receiver typically comprises a plurality of receiving devices each of which is configured to receive a separate signal. For example the receiver shown in FIG. 1 comprises $N_a$ receiving devices (not shown) where $N_a$ is an integer equal to or greater than 1. In the case where the receiving device is an array of $N_a$ antennae, the communication system modeled in FIG. 1 may be, for example, a mobile communication system (i.e., a wireless communication system). In a mobile (wireless) communication system (and other communication systems) each antenna receives signals located in a certain frequency band. The received signal is downconverted (i.e., frequency content of the signal is changed to lower frequencies) and applied to a matched filter. The filtered signal is sampled at a rate greater than or equal to 1/T where T is a period of time that represents a signaling interval (i.e., the amount of time between transmission of two consecutive symbols). The samples (i.e., sampled received signals,$y_i$) are fed to SOD 110. Further, well known receiver circuitry (e.g., amplifiers, filters), which are not shown, are also used to receive the plurality of different signals conveyed over channel 108. For the sake of simplicity and ease of illustration, the $N_a$ antennae and associated receiver circuitry are not shown. It will be readily understood that the receiver may be implemented with any well known receiving devices (other than antennae) that allow it to receive a plurality of separate signals. However, the receiving devices are hereinafter referred to as antennae simply for ease of discussion only. SOD 110 is a device that generates reliability information ($\Omega_i$) from the samples $y_i$.

The reliability information (or soft outputs) generated by SOD 110 represents a probability that the received signal is a particular group of bits from the set of bits defined by modulator 106 and examples of which are shown in FIG. 2, or the probability of each single bit within each transmitted symbol. It is important to note that the reliability information does not represent the actual transmitted signal but it provides an indication of the most likely signal that was transmitted. The output of SOD 110 (i.e., $\Omega_i$) is applied to Deinterleaver 112. Deinterleaver 112 performs the inverse operation of Interleaver 104 in that the signals $\Omega_i$ are rearranged in their proper time order. The output of Deinterleaver 112 ($\Omega_i'$) is applied to Soft Input Decoder 114 (SID). SID 114 performs a decoding operation that serves to decode the output of Deinterleaver 112 into a stream of bits represented by $b'_i$. Assuming the transmitter has a convolutional encoder, one example of a corresponding decoding operation is the Soft Input Viterbi Decoder which applies the well known Viterbi Decoding algorithm; G. D. Forney, *"The Viterbi Algorithm,"* Proc. IEEE, March 1973, pp. 268–278.

Samples $y_i$ represent the transmitted symbols $x_i$ after they have propagated through channel 108. Channel 108 has well known characteristics (e.g., amplitude response, phase response, impulse response) that alter the transmitted symbols. As is well known in communication theory, the channel is a source of distortions, viz., multiplicative distortion, (e.g., phase jitter, amplitude degradation, frequency translation) that directly affect the transmitted symbols; such distortions are typically characterized mathematically using statistical and probability models. Furthermore, at the receiver noise components are added to the signal. Noise components are typically added by receiver circuitry and other circuitry. One example of noise is Additive White Gaussian Noise (AWGN). The channel characteristics and noise represent the effects of the channel on the transmitted sequence of symbols $x_i$. The noise signals are represented by n. The multiplicative distortions from the channel are represented by h. The aggregate effect of the channel on the transmitted symbols ($x_i$) is thus represented by characteristic h and noise n. The received samples ($y_i$) are used to derive the reliability information. Channel State Information (CSI) is the total effect of the channel characteristic (h) (i.e., multiplicative distortion) on transmitted symbol. The CSI is equivalent to the impulse response (i.e., a function well known in electrical engineering that is used to fully describe a circuit) of the channel.

The goal of the receiver is to make a decision on the transmitted information bits $b_i$ from observing the sequence of sample $y_i$. Such goal can be achieved by applying the well known MAP (Maximum A Posteriori) criteria. Since there exists a unique relation between the sequence of information bits $b_i$ (denoted as b) and the coded sequence of bits $c_i$ (denote as c), the MAP algorithm selects a codeword given a sequence of samples $y_i$ which have propagated through a channel having a certain characteristic represented by h; that is, the algorithm selects the codeword that maximizes the probability that the transmitted sequence was $c_i$ given that the input sequence to the receiver is $y_i$. The probability being maximized is a conditional probability written as:

$$P(\underline{c}|\underline{y}, \underline{\underline{h}}) \quad (1)$$

Equation (1) and all other equations appearing in this application follow the convention in which double underlined variables represent matrices and single underlined variables represent vectors. The sequence of signals received by the receiver after such signals have propagated through a channel with characteristic h and noise n is usually given as:

$$\underline{y} = \underline{\underline{h}}\underline{x} + \underline{n} \quad (2)$$

where n represents the noise signals existing in the channel and h represents multiplicative distortion from the channel. Thus, for a receiver having $N_a$ antennae coupled to channel 108 with each antenna being sampled at $N_k$ ($N_k$ is an integer equal to or greater than 1) distinct points in time at rate 1/T, equation (2) can be written in the following form:

$$\begin{bmatrix} y_{0,0} & \cdots & y_{0,N_k-1} \\ \cdots & \cdots & \cdots \\ y_{N_a-1,0} & \cdots & y_{N_a-1,N_k-1} \end{bmatrix} = \begin{bmatrix} h_{0,0} & \cdots & h_{0,N_k-1} \\ \cdots & \cdots & \cdots \\ h_{N_a-1,0} & \cdots & h_{N_a-1,N_k-1} \end{bmatrix} \quad (3)$$

-continued $$\begin{bmatrix} x_0 & \cdots & 0 \\ \cdots & \cdots & \cdots \\ 0 & \cdots & x_{N_k-1} \end{bmatrix} + \underline{n}$$

The elements of the noise matrix $\underline{\underline{n}}$ are equally distributed statistically independent complex Gaussian variables with zero mean and power $E[|n_{a,k}|^2] = 2\sigma_a^2$. The real and imaginary components are independent zero mean Gaussian variables with standard deviation $\sigma_a$. It is well known that the first order statistics of a complex Gaussian random variable z with variance $2\sigma_a^2$ is given by a probability density function which is equal to:

$$p(z) = \frac{1}{2\pi\sigma_a^2} e^{-\frac{1}{2\sigma_a^2}|z|^2} \quad (3a)$$

J. Proakis, *Digital Communications*, 3d edition, McGraw Hill, 1995. The characteristic, h (e.g., amplitude response, phase response) of channel 108 can be measured and then stored in matrix form as shown in equation (3). The transmitted symbols ($x_i$) are represented by diagonal matrix $\underline{\underline{x}}$ where each diagonal element is a particular symbol generated by modulator 106. The elements of the diagonal matrix $\underline{\underline{x}}$, matrix $\underline{\underline{h}}$ and matrix $\underline{\underline{n}}$ are complex numbers. The complex conjugate of $\underline{\underline{h}}$, $\underline{\underline{x}}$ and $\underline{\underline{n}}$ is denoted with the use of an asterisks, i.e., $\underline{\underline{h}}^*$, $\underline{\underline{x}}^*$, $\underline{\underline{n}}^*$.

In essence, modulator 106 maps the sequence of input bits $d_i$ into a sequence of symbols. The particular mapping (e.g., Gray mapping) used generates a finite number of distinct symbols. As shown by equation (3), the transmitted symbols $x_i$ are multiplied by $\underline{\underline{h}}$ and then the noise is added. Equation (3) represents a communication system (e.g., mobile or wireless communication system) wherein a transmitted sequence of symbols propagates through a radio channel characterized by matrix $\underline{\underline{h}}$ and captured by an antenna array with $N_a$ elements. In radio mobile communications systems (i.e., wireless communication systems), the distortion is manifested by rapid variations in amplitude and phase commonly referred to as fading.

The application of the MAP algorithm leads to a two-stage receiver. The first stage (SOD) generates reliability information on the coded bits $d_i$. After deinterleaving, the second stage (SID) applies a maximization rule to make a final decision on the most likely transmitted code word ($\underline{c}$). In particular, assuming statistically independent coded bits, equation (1) can be written as:

$$P(\underline{c}|\underline{y}, \underline{\underline{h}}) = \prod_{l=0}^{N_c-1} P(c_l|\underline{y}, \underline{\underline{h}}) \quad (4)$$

where $N_c$ represents the number of bits; $N_c$ is equal number of symbols (i.e., samples)×number of bits/symbol or $N_c = N_k \times N$. From the well known Bayes Rule in probability theory, (J. Proakis, *Digital Communications*, 3d edition, Mc Graw Hill, 1995) equation (4) is written as:

$$P(\underline{c}|\underline{y},\underline{\underline{h}}) = \prod_{l=0}^{N_c-1} p(\underline{y}|\underline{\underline{h}}, c_l) \frac{P(c_l)}{p(\underline{y}|\underline{\underline{h}})} \quad (5)$$

where $p(\underline{y}|\underline{\underline{h}})$ and $p(\underline{y}|\underline{\underline{h}}, c_l)$ are conditional probability density functions. Depending on the statistical nature of the transmitted symbols and the channel, a particular probability density function (typically Gaussian) is used for $p(\underline{y}|\underline{\underline{h}}, c_l)$. Because, the goal is to maximize equation (5) over all possible codewords (c), $p(\underline{y}|\underline{\underline{h}})$ is a constant since it does not depend on $c_l$. The maximization operation can be done using the well known Viterbi algorithm or any other well known maximization algorithm, G. D. Forney, *The Viterbi Algorithm,* Proc. IEEE, March 1973. The maximization is performed by an outer stage of the receiver, i.e., SID 116. The result of the maximization of equation (5) is not altered when the logarithm (natural logarithm) of both sides of equation (5) is taken yielding:

$$\ln P(\underline{c}|\underline{y},\underline{\underline{h}}) = \sum_{l=0}^{N_c-1} \left\{ \ln p(\underline{y}|\underline{\underline{h}}, c_l) + \ln P(c_l) \right\} + C \quad (5a)$$

$P(c_l)$ is an a priori probability of coded bits $c_l$. An a priori probability is either a given or known probability value or a probability value that is simply assumed or hypothesized. When all coded bits are equally likely, $P(c_l)=\frac{1}{2}$. After deinterleaving, equation (5a) becomes:

$$\ln P(\underline{d}|\underline{y},\underline{\underline{h}}) = \sum_{l=0}^{N_c-1} \left\{ \ln p(\underline{y}|\underline{\underline{h}}, d_l) + \ln P(d_l) \right\} + C \quad (5b)$$

Since the interleaver maps a sequence of $N_c$ input bits into one unique sequence of $N_c$ output bits, the maximization of equations (5), (5a) over codewords $\underline{c}$ gives the same result as performing the maximization of equation (5b) over interleaved codewords $\underline{d}$.

The terms of the sum in equation (5b) are log likelihood functions calculated by SOD 110. Thus, the task of SOD 110 is to produce the following log likelihood function:

$$\Omega(d_l) = \ln p(\underline{y}|\underline{\underline{h}}, d_l) + \ln P(d_l) \quad (6)$$

Equation (6) is the output of SOD 110 that is then applied to Deinterleaver 112. Equation (6) is therefore produced from the samples $\underline{y}$. Thus, the log likelihood function of the $i^{th}$ bit in the $m^{th}$ time interval is expressed as:

$$\Omega_{m,i}(b) = \ln p(\underline{y}|\underline{\underline{h}}, d_{m,i}=b) + \ln P(d_{m,i}=b) \text{ where } b=0,1 \quad (7)$$

Equation (7) expresses the logarithm of the probability that the $i^{th}$ bit belonging to the symbol received at the $m^{th}$ time interval is a certain value. The log likelihood function $\Omega$ of equation (7) can be interpreted mathematically as a transform from the space of observations y to the space of the logarithm of probabilities P. It should be noted that if $\Omega_{m,i}(1)$ is greater than $\Omega_{m,i}(0)$, then the transmitted bit $d_{m,i}$ is more likely to be 1 than 0. Because there is a direct mapping between the variables x and d, the log likelihood function of equation (7) can be computed using the probability density function $p(\underline{y}|\underline{\underline{h}},\underline{x})$; this probability density function is expressed as:

$$p(\underline{y}|\underline{\underline{h}}, \underline{x}) = \prod_{a=0}^{N_a-1} p(\underline{y}_a|\underline{\underline{h}}_a, \underline{x}) \quad (8)$$

Equation (8) expresses the concept of independent channels (each antenna serves a particular channel) by each of the $N_a$ antennae; that is, the channels associated with each antennae are independent from any other channels. The antennae are statistically independent from each other, thus the factorization in equation (8) holds where each factor ($\underline{y}_a$) represents a sequence of samples received by an antenna a. Given the AWGN assumption, equation (8) can also be factored over time samples where each factor ($\underline{y}_k$) represents a sequence of samples received at time k by all antennae:

$$p(\underline{y}|\underline{\underline{h}}, \underline{x}) = \prod_{k=0}^{N_k-1} p(\underline{y}_k|\underline{\underline{h}}_k, x_k) \quad (9)$$

Combining equations (8) and (9) the joint probability density function for all $N_k$ samples of each of the $N_a$ antenna is obtained:

$$p(\underline{y}|\underline{\underline{h}}, \underline{x}) = \prod_{a=0}^{N_a-1} \prod_{k=0}^{N_k-1} p(y_{a,k}|h_{a,k}, x_k) \quad (10)$$

Combining equation (10) with equation (7), the log likelihood function can be expressed as follows:

$$\Omega_{m,i}(b) = \quad (11)$$

$$\ln \sum_{\underline{x} \in \underline{X}(d_{m,i})} p(\underline{y}|\underline{\underline{h}}, \underline{x}) = \ln \sum_{\underline{x} \in \underline{X}(d_{m,i})} \left( \prod_{a=0}^{N_a-1} \prod_{k=0}^{N_k-1} p(y_{a,k}|h_{a,k}, x_k) P(\underline{x}) \right)$$

$\underline{X}(d_{m,i})$ is the set of all possible transmitted sequences of symbols ($\underline{x}$) that have bit $d_{m,i}=b$. Therefore, as shown in equation (11), in order to compute the reliability information all possible transmitted sequences, their probabilities and the density functions (equations (8) and (9)) have to be determined. Thus, the generation of the reliability information is tedious and complex requiring many calculations. What is therefore needed is an efficient method of calculating the reliability information generated by SOD 110.

SUMMARY OF THE INVENTION

The present invention provides an efficient method for calculating reliability information (soft output) using a Soft Output Detector. The reliability information is calculated from received samples and a priori information. The received samples are symbols generated by a modulator which symbols have propagated through a communication channel. The received samples are applied to a Soft Output Detector that is part of a receiver comprising $N_a$ receiving devices where $N_a$ is an integer equal to or greater than 1. The method of the present invention has a first step of receiving a first sample and a second sample. An algebraic expression is evaluated from the first sample and/or second sample and from a priori information associated with the information contained in the transmitted symbols. The reliability information is then derived from the algebraic expression.

BRIEF DESCRIPTION OF THE DRAWINGS

FIG. 1 is a simplified block diagram of a communication system with a receiver having a Soft Output Detector;

FIG. 2 shows Gray mapping constellations for different groupings of bits into symbols;

FIG. 3 is a trellis chart for a 4-DPSK modulation;

DETAILED DESCRIPTION

Figure 4A:
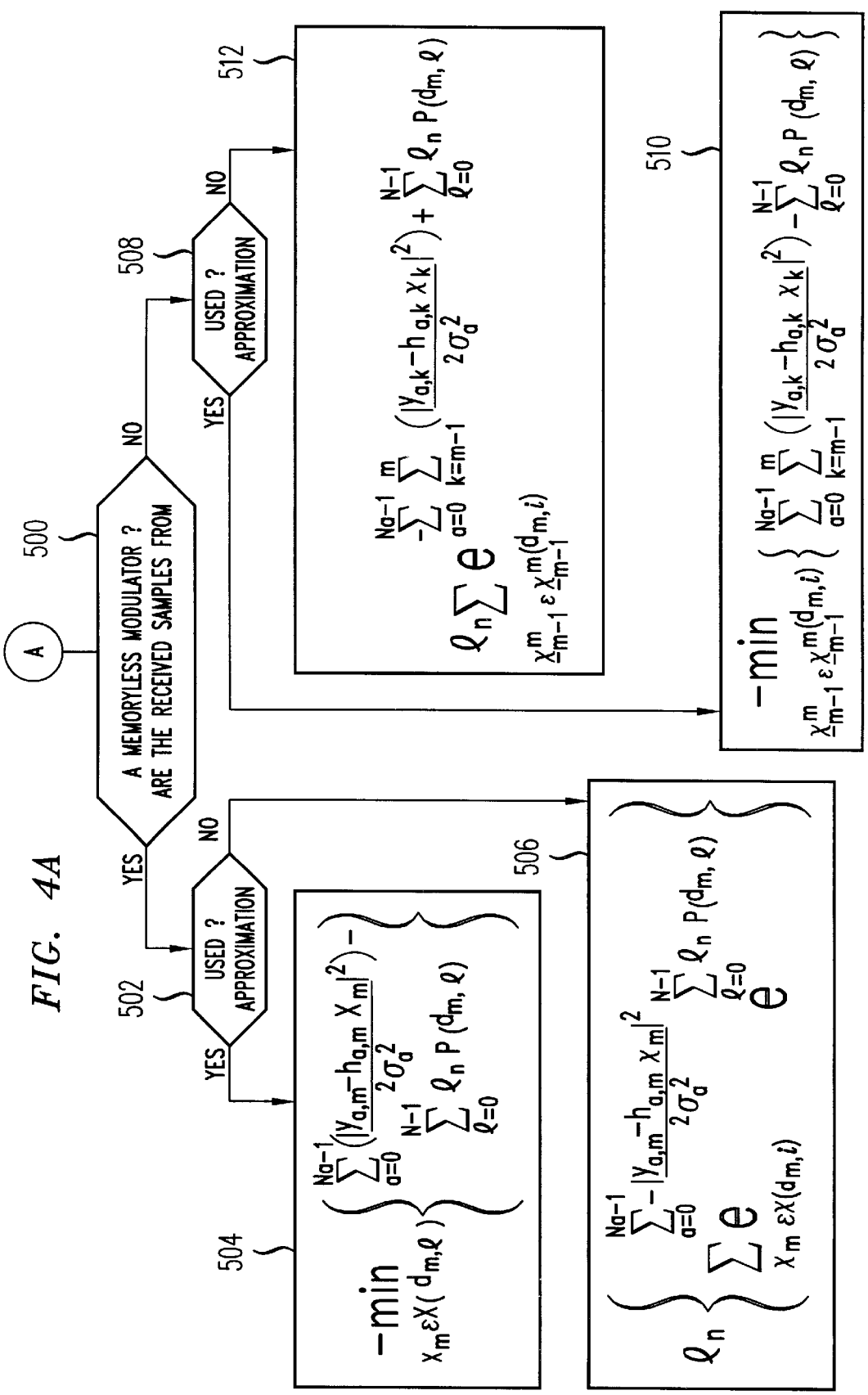
FIG. 4A is a flow chart of the method of the present invention.

The present invention provides a method for calculating and generating reliability information used to detect symbols transmitted over communication channels. The reliability information is calculated using the samples received by the receiver and a priori information. Multiplicative distortion introduced by the channel on the transmitted symbols is defined as the channel state information (CSI). It will be shown herein that in a communication system for which the CSI is known, the generation of the reliability information by an SOD reduces to a symbol by symbol calculation. Thus, for a communication system in which symbol sequences x, are generated by a constant envelope modulator and are transmitted and propagated through a channel having characteristic h and noise n and where such transmitted symbols are received by a receiver having $\overline{\overline{N}}_a$ receiving devices, the reliability information for the $i^{th}$ bit at the $m^{th}$ time interval is expressed in the following equations:

the transmitted symbols $x_i$ are generated with the use of a memoryless modulator (e.g., PSK modulator). A memoryless modulator, such as a PSK modulator, generates symbol $x_m$ at time m where the generation of symbol $x_m$ does not depend on any previously generated symbol. In contrast, a modulation scheme such as a DPSK scheme introduces memory in the generation of a symbol. In particular, the transmitted symbol $x_m$ is based on at least the previously generated symbol $x_{m-1}$. Equations (iii) and (iv) are the algorithms for generating reliability information for a communication system with a modulation scheme that introduces memory to the transmitted symbols. The algorithms are interpreted as transformations from the space of observations Y to the space of probabilities P. The additive noise sequence n is modeled as a sequence of complex variables that follow Gaussian statistics with zero mean and variance $2\sigma_a^2$, and the modulation scheme is a constant envelope scheme.

For a communication system in which symbol sequences $x_i$ are generated by a nonconstant envelope modulator and are transmitted and propagated through a channel having $$\Omega_{m,i}(b) \cong \max_{x_m \in X(d_{m,i})} \left\{ \sum_{a=0}^{N_a-1} \left( \frac{Re\{y_{a,m}h_{a,m}^* x_m^*\}}{\sigma_a^2} \right) + \sum_{l=0}^{N-1} (\ln P(d_{m,l})) \right\} \quad \text{(i)}$$

$$\Omega_{m,i}(b) = \ln \sum_{x_m \in X(d_{m,i})} \left( e^{\sum_{a=0}^{N_a-1} \left( \frac{Re\{y_{a,m}h_{a,m}^* x_m^*\}}{\sigma_a^2} \right) + \sum_{l=0}^{N-1} (\ln P(d_{m,l}))} \right) \quad \text{(ii)}$$

$$\Omega_{m,i}(b) \cong \max_{\underline{x}_{m-1}^m \in \underline{X}_{m-1}^m(d_{m,i})} \left\{ \sum_{a=0}^{N_a-1} \sum_{k=m-1}^{m} \left( \frac{Re\{y_{a,k}h_{a,k}^* x_k^*\}}{\sigma_a^2} \right) + \sum_{l=0}^{N-1} (\ln P(d_{m,l})) \right\} \quad \text{(iii)}$$

$$\Omega_{m,i}(b) = \ln \sum_{\underline{x}_{m-1}^m \in \underline{X}_{m-1}^m(d_{m,i})} \left( e^{\sum_{a=0}^{N_a-1} \sum_{k=m-1}^{m} \left( \frac{Re\{y_{a,m}h_{a,m}^* x_m^*\}}{\sigma_a^2} \right) + \sum_{l=0}^{N-1} (\ln P(d_{m,l}))} \right) \quad \text{(iv)}$$

where a indicates a particular antenna and m indicates a particular signaling interval.

Equations (i) and (ii) are the algorithms for generating reliability information for a communication system in which characteristic h and noise n and where such transmitted symbols are received by a $\overline{\overline{r}}$eceiver having $\overline{\overline{N}}_a$ receiving devices, the reliability information for the $i^{th}$ bit at the $m^{th}$ time interval is expressed in the following equations:

$$\Omega_{m,i}(b) \cong -\min_{x_m \in X(d_{m,i})} \left\{ \sum_{a=0}^{N_a-1} \left( \frac{|y_{a,m} - h_{a,m}x_m|^2}{2\sigma_a^2} \right) - \sum_{l=0}^{N-1} (\ln P(d_{m,l})) \right\} \quad \text{(v)}$$

$$\Omega_{m,i}(b) = \ln \sum_{x_m \in X(d_{m,i})} \left( e^{\sum_{a=0}^{N_a-1} \left( \frac{-|y_{a,m} - h_{a,m}x_m|^2}{2\sigma_a^2} \right)} e^{\sum_{l=0}^{N-1} (\ln P(d_{m,l}))} \right) \quad \text{(vi)}$$

$$\Omega_{m,i}(b) \cong -\min_{\underline{x}_{m-1}^m \in \underline{X}_{m-1}^m(d_{m,i})} \left\{ \sum_{a=0}^{N_a-1} \left( \frac{|y_{a,m} - h_{a,m}x_m|^2}{2\sigma_a^2} \right) - \sum_{l=0}^{N-1} (\ln P(d_{m,l})) \right\} \quad \text{(vii)}$$

$$\Omega_{m,i}(b) = \ln \sum_{\underline{x}_{m-1}^m \in \underline{X}_{m-1}^m(d_{m,i})} \left( e^{\sum_{a=0}^{N_a-1} \left( \frac{-|y_{a,m} - h_{a,m}x_m|^2}{2\sigma_a^2} \right) + \sum_{l=0}^{N-1} (\ln P(d_{m,l}))} \right) \quad \text{(viii)}$$

Equations (v) and (vi) are the algorithms for generating reliability information for a communication system in which the transmitted symbols $x_i$ are generated with the use of a memoryless nonconstant envelope modulator. Equations (vii) and (viii) are the algorithms for a nonconstant envelope modulator with memory.

Figure 4B:
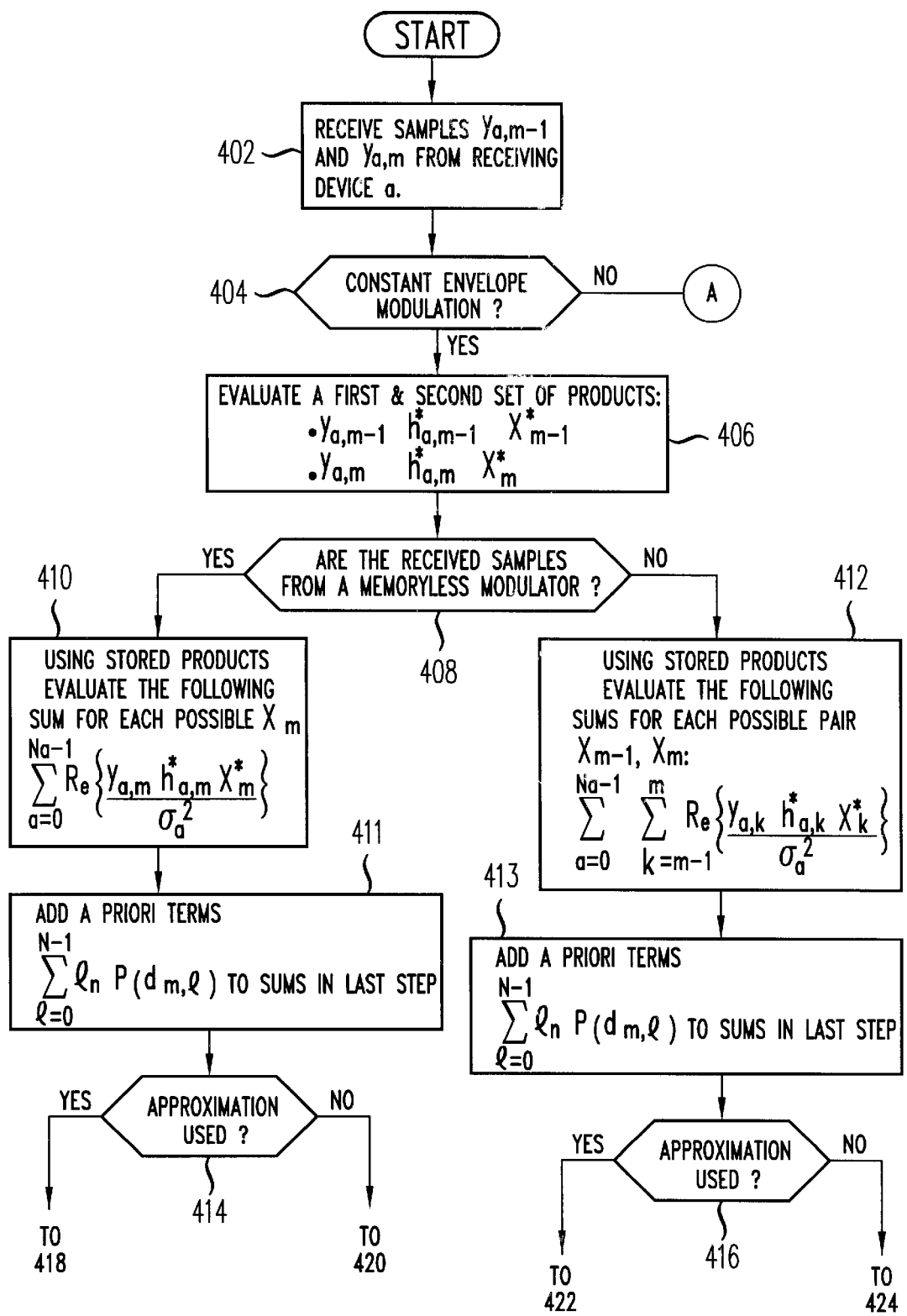
FIG. 4B–4D is a continuation of the flowchart of FIG. 4A.
Figure 4C:
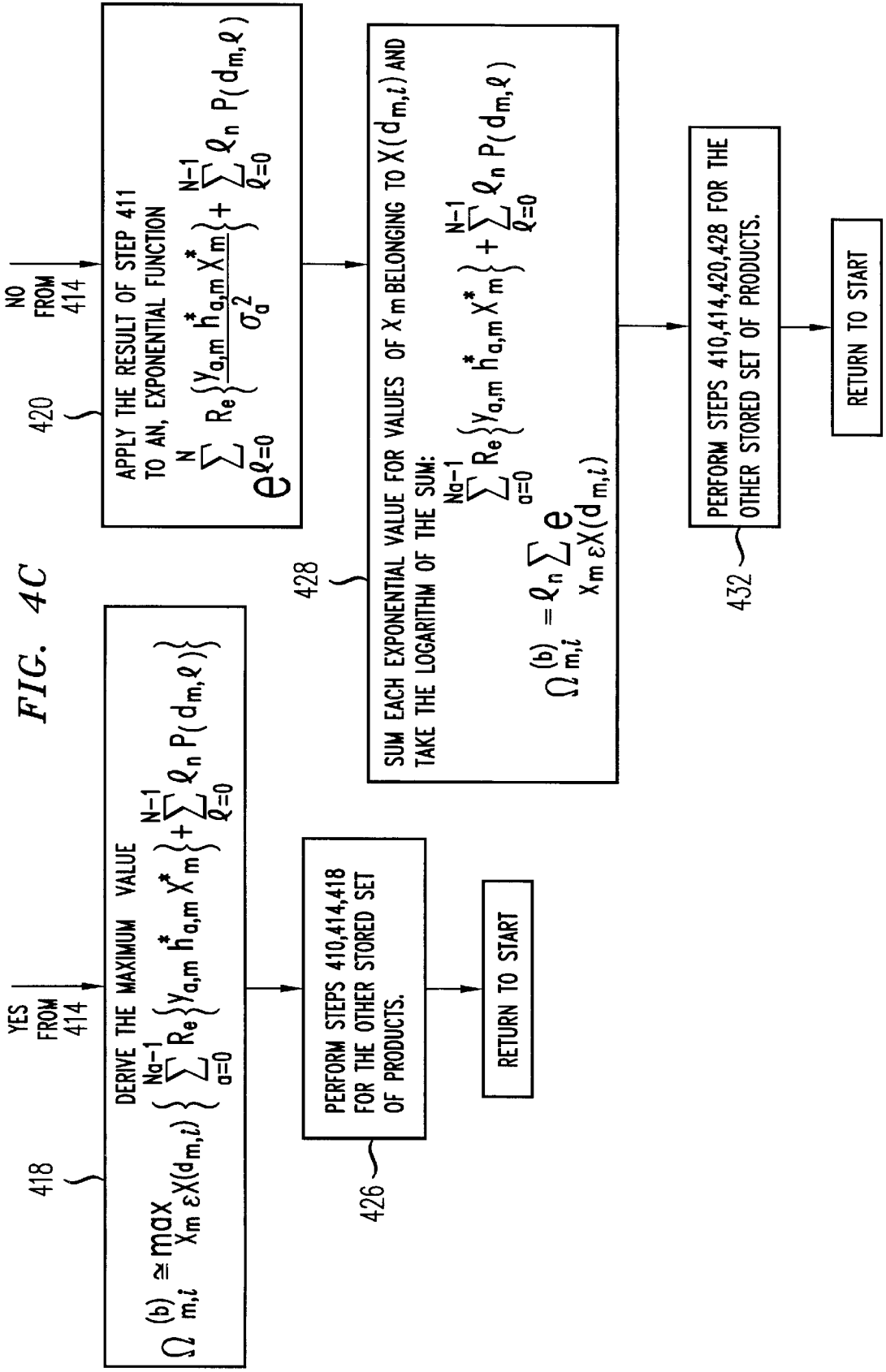
Figure 4D:
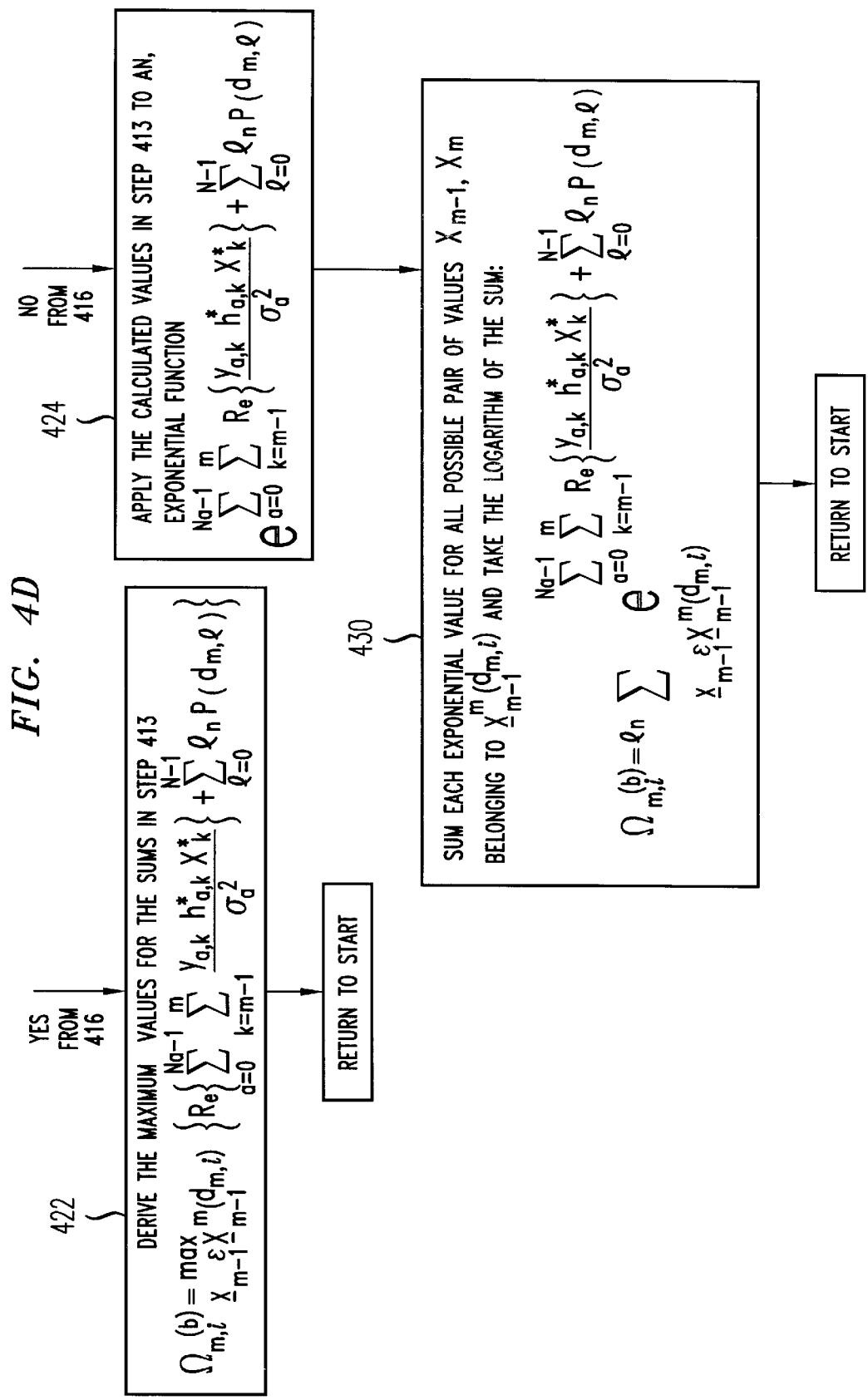

Referring to FIG. 4, the steps of the method of the present invention are shown. In step 402, a receiving device a receives sample $y_{a,m-1}$ and sample $y_{a,m}$. The samples are usually from consecutive time intervals. The matrices $\overline{\overline{h}}$ and $\overline{\overline{x}}$ have elements that correspond to received samples $\overline{\overline{y}}$. Thus, when $y_{a,m}$ is received, the corresponding possible transmitted symbol is $x_m$ and the corresponding distortion element is $h_{a,m}$. In step 404, the method of the present invention goes to step 500 (see FIG. 4A) if a constant envelope modulation scheme is not being used. The algorithm for the nonconstant envelope case is discussed infra. For the case of a constant envelope, the method of the present invention goes to step 406 in which a first set of products $y_{a,m-1}h^*_{a,m-1}x^*_{m-1}$) and a second set of products $(y_{a,m}h^*_{a,m}x^*_m)$ are evaluated and stored. These products are calculated for all possible symbols $x_m$, $x_{m-1}$. It should be noted that the value for h used in the calculation of the products is obtained from a stored matrix h. The method of the present invention moves to step 408 where it is decided that one of two possible algorithms is used depending on whether the received samples were generated from a memoryless or a memory introducing modulator.

I. Memoryless Case

Starting from step 410 an algebraic expression is derived from which the reliability information is calculated and generated. In step 410, the real part of the first stored product for all $N_a$ receiving devices for one value of $x_m$ is evaluated and the sum (over all $N_a$ devices) is taken; this step is repeated for all possible values of $x_m$. It should be noted that each stored product is divided by the factor $\sigma_a^2$ (i.e. half the noise variance for receiving device a). In step 411, an a priori term is added. This term is obtained by summing the logarithm of the probabilities of the bits associated with the symbol $x_m$. If no a priori knowledge on the transmitted bits is available, the term added in step 411 can be considered a constant and be omitted.

In step 414, the method of the present invention decided whether to use an approximation in generating the reliability information. The approximation used and the justification for using such an approximation is discussed infra in the derivation of equation (i) and (ii). If the approximation is used, the method of the present invention moves to step 418 where a maximum value is derived from a set of values determined at step 411. The set of values is determined by selecting the list of values in step 411 corresponding to symbols $x_m$ associated with the bit for which the reliability information is computed (i.e. the set of symbols $x_m$ belonging to the set $x(d_{m,i})$). The derivation of the maximum value applies any well known maximization technique that calculates the maximum value from a list of values. It should be noted that in step 410, the division by $\sigma_a^2$ is not needed when no a priori information is available, and all $N_a$ devices are characterized by the same noise variance when the approximation is being used. In step 426, the reliability information for the other stored value (from step 406) is determined, i.e., steps 410, 411, 414, 418 are again performed. After the completion of step 426, the method of the present invention moves to the start and two new sequences of samples are stored for computing reliability information associated with these two new samples.

Returning to step 414, if the aforementioned approximation is not used, the method of the present invention moves to step 420. In step 420, each value calculated in step 411 is applied to an exponential function. In step 428, the exponentials for all values $x_m$ belonging to the set $X(d_{m,i})$ are summed and the logarithm of the result is taken resulting in equation (ii). In step 432 the reliability information for the other stored product (from step 406) is also determined, i.e., steps 410, 411, 414, 420 and 428 are applied to the other product. After the completion of step 432, the method of the present invention moves to the start and two new sequences of samples are stored for computing reliability information associated with these two new samples.

II. Memory Case

Returning to step 408, when the received samples were generated from a modulator that introduces memory to the transmitted symbols, the method of the present invention moves to step 412. Starting from step 412, an algebraic expression is derived from which the reliability information is calculated and generated. In step 412, the sum of the real portions of the first and second products for all possible pair of symbols $x_{m-1}$, $x_m$ is evaluated (each product is divided by $\sigma_a^2$) and that sum is evaluated over all $N_a$ receiving devices. In step 413, an a priori term is added. This term is obtained by summing the logarithm of the probabilities of the bits associated with the transition from symbol $x_{m-1}$ to symbol $x_m$. If no a priori information about the transmitted bits is available, the a priori term added in step 413 can be considered a constant and thus be omitted. In step 416, the method of the present invention decides whether to use an approximation in generating the reliability information. The approximation used and the justification for using such an approximation is discussed infra in the derivation of equations (iii) and (iv). If the approximation is used, the method of the present invention moves to step 422 where the maximum value from a set of values calculated at step 413 is derived. The set of values is determined by selecting the values calculated in step 413 for the pair of symbols $x_{m-1}$, $x_m$ that belong to the set $X_{m-1}^m(d_{m,i})$. The method of the present invention then returns to its start. The derivation of the maximum value applies any well known maximization technique that calculates a maximum value from a list of values. It should be noted that in step 412 the division by $\sigma_a^2$ is not needed when no a priori information is available and all $N_a$ devices are characterized by the same noise variance when the approximation is being used.

Returning to step 416, if the aforementioned approximation is not used, the method of the present invention moves to step 424. In step 424 the sum in step 413 is applied to an exponential function. In step 430, the exponential for all pairs of symbols $x_{m-1}$, $x_m$ that belong to the set $X_{m-1}^m(d_{m,i})$ are summed and the logarithm of the result is taken resulting in equation (iv). The method of the present invention then returns to its start.

III. Derivation of SOD Algorithm for Memoryless Modulation Schemes

Equation (11) was given as the algorithm for generating reliability information for a communication system as depicted in FIG. 1:

$$\Omega_{m,i}(b) = \ln \sum_{\underline{x} \in \underline{X}(d_{m,i})} p(\underline{y}|\underline{h}, \underline{x}) P(\underline{x}) = \ln \sum_{\underline{x} \in \underline{X}(d_{m,i})} \left\{ \left( \prod_{a=0}^{N_a-1} \prod_{k=0}^{N_k-1} p(y_{a,k}|h_{a,k}, x_k) \right) P(\underline{x}) \right\} \quad (11)$$

The process of interleaving the bits causes such bits to be statistically independent of each other. The symbols are independent as a result of mapping independent input bits to the modulator. Because the modulation scheme does not introduce memory to the transmitted symbols, the probability of a transmitted sequence of symbols $P(\underline{x})$ can be factored:

$$P(\underline{x}) = \prod_{k=0}^{N_k-1} P(x_k) \quad (12)$$

When equations (11) and (12) are combined, the following equation is obtained:

$$\Omega_{m,i}(b) = \ln \sum_{\underline{x} \in \underline{X}(d_{m,i})} \left[ \prod_{a=0}^{N_a-1} \left( \prod_{k=0}^{N_k-1} p(y_{a,k}|h_{a,k}, x_k) P(x_k) \right) \right] \quad (13)$$

$$= \ln \sum_{\underline{x} \in \underline{X}(d_{m,i})} \left[ \prod_{k=0}^{N_k-1} \left( \prod_{a=0}^{N_a-1} p(y_{a,k}|h_{a,k}, x_k) \right) P(x_k) \right]$$

$$= \ln \sum_{\underline{x} \in \underline{X}(d_{m,i})} \left[ \prod_{k=0}^{N_k-1} p(\underline{y}_k|\underline{h}_k, x_k) P(x_k) \right]$$

The symbols in a memoryless sequence (e.g., M-PSK sequence) are independent. Therefore, the sum in equation (13) can be obtained with $N_k$ independent sums as follows:

$$\Omega_{m,i}(b) = \ln \left\{ \sum_{x_0 \in X} \cdots \sum_{x_m \in X(d_{m,i})} \cdots \sum_{x_{N_k-1} \in X} \left( \prod_{k=0}^{N_k-1} p(\underline{y}_k|\underline{h}_k, x_k) P(x_k) \right) \right\} \quad (14)$$

$$= \ln \left\{ \prod_{k=0}^{m-1} p(\underline{y}_k|\underline{h}_k) \prod_{k=m+1}^{N_k-1} p(\underline{y}_k|\underline{h}_k) \sum_{x_m \in X(d_{m,i})} p(\underline{y}_m|\underline{h}_m, x_m) P(x_m) \right\}$$

In equation (14) X is the set of all possible transmitted symbols at any given time, while $X(d_{m,i})$ is the set of all possible transmitted symbols at time m that have bit $d_{m,i}=b$. Further, a review of equation (14) reveals that the first two factors are independent of $d_{m,i}$ and can be considered constants. Therefore, equation (14) is written as:

$$\Omega_{m,i}(b) = C_{m-1} + C_{m+1} + \ln \sum_{x_m \in X(d_{m,i})} \left\{ \prod_{a=0}^{N_a-1} (p(y_{a,m}|h_{a,m}, x_m)) P(x_m) \right\} \quad (15)$$

Equation (15) reveals that the reliability information associated with bit $d_{m,i}=b$ is evaluated by only looking at the samples at time m. Since the bits mapped into a symbol are independent, it follows that the a priori probability of a symbol is the product of the a priori probabilities of the bits (i.e., $P(d_{m,l})$):

$$P(x_m) = \prod_{l=0}^{N-1} P(d_{m,l}) \quad (15a)$$

The a priori probability is either a given probability value or a probability value that is simply assumed, hypothesized arbitrarily or estimated. When the additive noise follows Gaussian statistics, (i.e., noise $\underline{n}$ is AWGN), the probability density function in equation (15) also follows Gaussian statistics. Then substituting equation (15a) into equation (15), the following is obtained:

$$\Omega_{m,i}(b) = C + \ln \sum_{x_m \in X(d_{m,i})} \left\{ \frac{1}{\prod_{a=0}^{N_a-1} 2\pi\sigma_a^2} e^{\sum_{a=0}^{N_a-1} \frac{-|y_{a,m}-h_{a,m}x_m|^2}{2\sigma_a^2}} \prod_{l=0}^{N-1} P(d_{m,l}) \right\} \quad (16)$$

$$= C + \ln \sum_{x_m \in X(d_{m,i})} \left\{ e^{\sum_{a=0}^{N_a-1} \frac{-|y_{a,m}-h_{a,m}x_m|^2}{2\sigma_a^2}} e^{\sum_{l=0}^{N-1} \ln P(d_{m,l})} \right\}$$

The sum in equation (16) is extended over all combinations of bits, i.e., symbols $x_m$ for which $d_{m,l}=b$. Note equation (16)

is the same as equation (vi). Since the exponential function enhances amplitude and phase variations occurring in its argument, an approximated version of equation (16) is obtained when only the largest term in the outer sum is considered. The use of this approximation (see step 414 of FIG. 4) leads to equation (17):

$$\Omega_{m,i}(b) \cong C + \ln \max_{x_m \in X(d_{m,i})} \left\{ e^{\sum_{a=0}^{N_a-1} \frac{-|y_{a,m} - h_{a,m} x_m|^2}{2\sigma_a^2} + \sum_{l=0}^{N-1} \ln P(d_{m,l})} \right\}$$

$$= C - \min_{x_m \in X(d_{m,i})} \left\{ \sum_{a=0}^{N_a-1} \left( \frac{|y_{a,m} - h_{a,m} x_m|^2}{2\sigma_a^2} \right) - \sum_{l=0}^{N-1} (\ln P(d_{m,l})) \right\}$$ (17)

Note, equation (17) is the same as equation (v). If the modulation is 2-PSK then no approximation is required since the outer sum in equation (16) has only one term. When a constant envelope modulation technique (e.g., M-PSK, M-DPSK) is used, i.e., $|x_k|^2 = K$, where K is a constant; without any loss of generality K=1, the following relationship exists: $|y_{a,m} - h_{a,m} x_m|^2 = |y_{a,m}|^2 + |h_{a,m}|^2 - 2\text{Re}\{y_{a,m} h^*_{a,m} x^*_m\}$; when this relationship is substituted into equation (17), equation(18) is obtained:

$$\Omega_{m,i}(b) \cong \max_{x_m \in X(d_{m,i})} \left\{ \sum_{a=0}^{N_a-1} \left( \frac{\text{Re}\{y_{a,m} h^*_{a,m} x^*_m\}}{\sigma_a^2} \right) + \sum_{l=0}^{N-1} (\ln P(d_{m,l})) \right\} + C$$ (18)

When the same relationship is substituted into equation (15) and the approximation is not used, equation (19) is obtained:

$$\Omega_{m,i}(b) = \ln \sum_{x_m \in X(d_{m,i})} \left( e^{\sum_{a=0}^{N_a-1} \left( \frac{\text{Re}\{y_{a,m} h^*_{a,m} x^*_m\}}{\sigma_a^2} \right) + \sum_{l=0}^{N-1} (\ln P(d_{m,l}))} \right) + C$$ (19)

When the information bits $b_i$ are assumed to be equally likely, the a priori probability term $$\left( \text{i.e., } \sum_{l=0}^{N-1} \ln P(d_{m,l}) \right)$$

in equations (18) and (19) is a constant that is equal to 1/M. Equations (18) and (19) are the same as equations (i) and (ii) respectively. It should be noted that in equations (18) and (19), CSI and noise variance for each antenna have to be calculated. Many known techniques are available to perform such calculations.

IV. Derivation of SOD Algorithm for Modulation Schemes with Memory

Again, starting with equation (11) and assuming that each of the transmitted sequences have equal probabilities (i.e., $P(\underline{x}) = K$, where K=constant), the following equation results:

$$\Omega_{m,i}(b) = C + \ln \sum_{\underline{x} \in X(d_{m,i})} p(\underline{y} | \underline{\underline{h}}, \underline{x})$$ (20)

One example of a modulator that introduces memory is an M-DPSK modulator. The M-DPSK modulator is considered a transformation (with memory) from the space of information bits D to the space of signals X; this is represented mathematically as:

$$x_k = f(x_{k-1}, d_{k,0}, \ldots, d_{k,N-1}) = x_{k-1} \xi_k = e^{j\frac{2\pi}{M}\varphi_k}$$ (21)

where $\phi_k$ is the phase at time k. It should be noted that the amplitude of $x_k$ is arbitrarily set to one. $\xi_k$ is a phase transition at time instant k, and x is a differentially encoded signal at time k. The phase transition is obtained by mapping the N original bits into an M-PSK constellation point. Mapping is shown, for example in FIG. 2A for M=2,4,8. Differential modulation is performed by grouping a block of N=log M bits into a complex symbol and then multiplying this symbol by a previous differentially encoded symbol. In terms of a phase of a symbol, the M-DPSK modulator is considered a transformation (with memory) from the space of information bits d to the space of phases:

$$\phi_k = f(\phi_{k-1}, d_{k,0} \ldots, d_{k,N-1}) = f(\phi_{k-1}, \delta_k) = \phi_{k-1} + \delta_k$$ (22)

where $\phi_k$ represents the phase of a symbol at time k (i.e., a phase index, an integer number) and $\delta_k$ represents the change in phase between time k and time k-1 (i.e., a transition phase index):

$$\delta_k = \phi_k - \phi_{k-1} \text{ for } \phi_k \geq \phi_{k-1} = M + \phi_k - \phi_{k-1} \text{ for } \phi_k < \phi_{k-1}$$ (23)

The transmitted complex symbol is given by $$x_k = e^{j\frac{2\pi}{M}\varphi_k}.$$

A graph known as a trellis is used to represent the time evolution of an M-DPSK sequence of symbols. The graph has M states (i.e., phases) with branches from the states representing the transition from any one of all of the states to any other state. A trellis for a 4-DPSK modulator is shown in FIG. 3. The trellis is alternatively described by a transition matrix T. Each element T(i,j) is a transition phase index giving the transition of a signal with phase $\phi=i$ to a signal having phase $\phi=j$. The M-DPSK modulator maps (e.g., Gray mapping) incoming bits $d_{k,i}$ for $i=0, \ldots, (\log_2 M-1)$ to corresponding phase transition indices. For a particular input bit $d_{k,i} = b$, there are $2^{(\log_2 M)-1}$ possible transition phase indices. The set of transition phase indices can be represented with a matrix G(b). An element $G_b(i,j)$, where $i=0, \ldots, N-1$ and $j=0, \ldots, 2^{\log_2 M-1}-1$ represents the jth transition phase index for bit $d_{k,i} = b$.

A set $\underline{X}(d_{m,i})$ comprises sequences $x_k$ for $k=0, \ldots, m-2$ and $k=m+1, \ldots N_k-1$, but with $x_{m-1}, x_m$ belonging to a set specified by T and G matrices. One example of M-DPSK modulation is $\pi/4$ DQPSK used in IS-136 TDMA wireless communication systems. IS-136 is an established standard used for TDMA wireless communication systems in North America. Assuming a sequence of independent noise samples as in the AWGN case, equation (20) is written as:

$$\Omega_{m,i}(b) = C + \ln \sum_{x \in X(d_{m,i})} p\left(\underline{y}_0^{m-2} \middle| \underline{H}_0^{m-2}, x_0^{m-2}\right) \quad (24)$$

$$p\left(\underline{y}_{m-1}^m \middle| \underline{H}_{m-1}^m, x_{m-1}^m\right) p\left(\underline{y}_{m+1}^{N_k-1} \middle| \underline{H}_{m+1}^{N_k-1}, x_{m+1}^{N_k-1}\right) \underline{y}_{m+1}^{N_k-1}$$

where $\underline{y}_i^j$ represents the sequence of samples received by the antenna array from time i to time j, while $\underline{x}_i^j$ represents the sequence of transmitted symbols from time i to time j. After some algebraic manipulation and combining all constant terms (terms independent of time), the sum in equation (24) is written as:

$$\Omega_{m,i}(b) = C + \ln \sum_{\underline{x}_{m-1}^m \in \underline{X}_{m-1}^m(d_{m,i})} \left( e^{-\sum_{a=0}^{N_a-1} \sum_{k=m-1}^{m} \frac{|y_{a,k} - h_{a,k} x_k|^2}{2\sigma_a^2}} \right) \quad (25)$$

Where $\underline{X}_{m-1}^m(d_{m,i})$ is the set of all possible sequences $\underline{x}_{m-1}^m(d_{m,i})$ (i.e., a pair of symbols $x_{m-1}$, $x_m$) having bit $d_{m,i} = b$. An approximation of equation (25) can be obtained if we consider only the largest term in the outer sum. This is the approximation to which step 416 of FIG. 4 refers. The approximation leads to equation (26):

$$\Omega_{m,i}(b) \cong C - \min_{\underline{x}_{m-1}^m \in \underline{X}_{m-1}^m(d_{m,i})} \left\{ \sum_{a=0}^{N_a-1} \sum_{k=m-1}^{m} \left| \frac{y_{a,k} - h_{a,k} x_k}{2\sigma_a^2} \right|^2 \right\} \quad (26)$$

Again, as in the memoryless case, for the case of a modulation technique that has a constant envelope, the following relationship exists: $|y_{a,m} - h_{a,m} x_m|^2 = |y_{a,m}|^2 + |h_{a,m}|^2 - 2 \operatorname{Re}\{y_{a,m} h^*_{a,m} x^*_m\}$;

when this relationship is substituted into equation (26) and the constant C is omitted, equation (27) is obtained:

$$\Omega_{m,i}(b) \cong \max_{\underline{x}_{m-1}^m \in \underline{X}_{m-1}^m(d_{m,i})} \sum_{a=0}^{N_a-1} \sum_{k=m-1}^{m} \operatorname{Re}\left\{ \frac{y_{a,k} h^*_{a,k} x^*_k}{2\sigma_a^2} \right\} \quad (27)$$

when the same relationship is substituted into equation (25) and the approximation is not used, equation (28) is obtained:

$$\Omega_{m,i}(b) = C + \ln \sum_{\underline{x}_{m-1}^m \in \underline{X}_{m-1}^m(d_{m,i})} e^{\sum_{a=0}^{N_a-1} \sum_{k=m-1}^{m} \frac{\operatorname{Re}\{y_{a,k} h^*_{a,k} x^*_k\}}{\sigma_a^2}} \quad (28)$$

When the a priori probability of the information bits $$\left( \text{i.e.,} \sum_{l=0}^{N-1} \ln P(d_{m,l}) \right)$$

is taken into account as in the memoryless case discussed above, equations (25)–(26) and equations (27)–(28) are written in a more general form. Thus, equation (25) becomes equation (vii), equation (26) becomes equation (viii), equation (27) becomes equation (iii) and equation (28) becomes equation (iv) as follows:

$$\Omega_{m,i}(b) \cong \max_{\underline{x}_{m-1}^m \in \underline{X}_{m-1}^m(d_{m,i})} \left\{ \sum_{a=0}^{N_a-1} \sum_{k=m-1}^{m} \left( \frac{\operatorname{Re}\{y_{a,k} h^*_{a,k} x^*_k\}}{\sigma_a^2} \right) + \sum_{l=0}^{N-1} (\ln P(d_{m,l})) \right\} \quad \text{(iii)}$$

$$\Omega_{m,i}(b) = \ln \sum_{\underline{x}_{m-1}^m \in \underline{X}_{m-1}^m(d_{m,i})} \left( e^{\sum_{a=0}^{N_a-1} \sum_{k=m-1}^{m} \left( \frac{\operatorname{Re}\{y_{a,m} h^*_{a,m} x^*_m\}}{\sigma_a^2} \right) + \sum_{l=0}^{N-1} (\ln P(d_{m,l}))} \right) \quad \text{(iv)}$$

$$\Omega_{m,i}(b) = C + \ln \sum_{\underline{x}_{m-1}^m \in \underline{X}_{m-1}^m(d_{m,i})} \left( e^{-\sum_{a=0}^{N_a-1} \sum_{k=m-1}^{m} \frac{|y_{a,k} - h_{a,k} x_k|^2}{2\sigma_a^2}} e^{\sum_{l=0}^{N-1} \ln P(d_{m,l})} \right) \quad \text{(vii)}$$

$$\Omega_{m,i}(b) \cong C - \min_{\underline{x}_{m-1}^m \in \underline{X}_{m-1}^m(d_{m,i})} \left( \left\{ \sum_{a=0}^{N_a-1} \sum_{k=m-1}^{m} \frac{|y_{a,k} - h_{a,k} x_k|^2}{2\sigma_a^2} \right\} - \sum_{l=0}^{N-1} \ln P(d_{m,l}) \right) \quad \text{(viii)}$$

It should be noted that the bits $d_{m,l}$ are the input bits to the modulator with memory that produce the transition from symbol $x_{m-1}$ to symbol $x_m$. In other words they are the bits that are associated with the transition from $x_{m-1}$ to $x_m$. These are the bits defined by the matrices $\underline{\underline{T}}$ and $\underline{\underline{G}}$.

V. Nonconstant Envelope Modulation

Returning to step 404 of FIG. 4, when a constant envelope modulation technique is not used, the method of the present invention moves to step 500. In step 500 where it is decided that one of two possible algorithms is used depending on whether the received samples were generated from a memoryless or a memory introducing modulator. In ensuing steps 504, 506, 510 and 512 (discussed infra), algebraic expressions are derived from which the reliability information is calculated and generated.

A. Memoryless Case for Nonconstant Envelope Modulation

In step 502, the method of the present invention decides whether to use an approximation in generating reliability information. As discussed in Section III of this specification, the reliability information is given by equation (17) or (v) when an approximation is used, i.e., step 504 and equation (16) or (vi) when the approximation is not used, i.e., step 506.

In particular, in step 504, the reliability value of bit $d_{m,i}$ is approximated by finding a minimum value from a set of possible values. Then, the sign of the result of the minimization is changed. Each value in the set is determined from a possible transmitted symbol $x_m$ associated to bit $d_{m,i}$. From the symbol $x_m$ two sums are computed and then the difference of the two sums is taken. The first sum is computed over all receiving devices, and each element in the sum is the difference between a received sample $y_{a,m}$ and the product represented by $h_{a,m} x_m$. The absolute value of the difference is squared and the result is divided by the noise variance ($2\sigma_a^2$) in the corresponding receiving device. The second sum in step 504 is the sum of the logarithm of the a priori probabilities of the bits associated with symbol $x_m$. If no a priori information about the transmitted bits is available, the a priori term added in step 504 can be considered a constant and thus can be omitted. Furthermore, in step 504 the division by $2\sigma_a^2$ is not needed when no a priori information is available and all $N_a$ devices are characterized by the same noise variance.

In step 506, the logarithm of a sum over all symbols in the set $\underline{X}(d_{m,i})$, is calculated. The sum has two exponential functions multiplied to each other. The first exponential function is raised to a first exponent. The first exponent is a sum equal to the first sum of step 504 with opposite sign. The second exponential function is raised to a second exponent which is equal to the second sum of step 504. If no a priori information about the transmitted bits is available, the a priori term added in step 506 can be considered a constant and thus can be omitted.

B. Memory Case for Nonconstant Envelope Modulation

In step 508, the method of the present invention decides whether to use an approximation in calculating reliability information. As discussed in section IV of this specification, the reliability information is given by equation (vii) when an approximation is used, i.e., step 510 and equation (viii) when the approximation is not used, i.e., step 512.

In step 510, an inner sum and an outer sum are calculated using two consecutive samples. The inner sum is the sum over two consecutive samples of an algebraic expression which algebraic expression appears in the first sum of step 504. The outer sum is the sum over $N_a$ devices of the inner sum. Another sum of the logarithm of the a priori probabilities of the bits associated with the transition from symbol $x_{m-1}$ to symbol $x_m$ is subtracted from the previous sum. Finally, a minimum value of the result over all possible pair of symbols associated with transitions corresponding to the bit for which the reliability information is computed, is calculated and the opposite value of that computation is taken. If no a priori information about the transmitted bits is available, the a priori term added in step 510 can be considered a constant and thus can be omitted. Furthermore, in step 510 the division by $2\sigma_a^2$ is not needed when no a priori information is available and all $N_a$ devices are characterized by the same noise variance.

In step 512, the reliability information is calculated as the logarithm of a sum over all possible pair of symbols associated with transitions corresponding to the bit for which the reliability information is computed. The terms in the sum are exponential functions whose exponents are the opposite of the sums (inner and outer) of step 510. If no a priori information about the transmitted bits is available, the a priori term added in step 512 can be considered a constant and thus can be omitted.

What is claimed is:

1. A method for calculating reliability information, the method comprises the steps of:
    (a) receiving a first sample and a second sample derived from transmitted symbols;
    (b) determining if 1) the first and second samples are generated by a constant envelope modulator and 2) the first and second samples are generated by a memoryless modulator;
    (c) evaluating one of a set of algebraic expressions from the samples and from a priori information based on the determination; and
    (d) deriving the reliability information from the algebraic expression.

2. The method of claim 1 wherein the transmitted symbols are generated by a constant envelope modulator.

3. The method of claim 2 wherein the step of receiving a first sample and a second sample comprises the step of:
    receiving first and second samples for each of $N_a$ receiving devices where $N_a$ is an integer equal to or greater than 1.

4. The method of claim 3 wherein the step of evaluating an algebraic expression comprises the steps of:
    evaluating a set of products for all possible transmitted symbols from received first samples for each of the $N_a$ receiving devices;
    evaluating a set of sums from the set of products for all $N_a$ receiving devices; and adding a priori information to the set of sums resulting in the algebraic expression.

5. The method of claim 3 wherein the step of deriving the reliability information from the algebraic expression comprises the steps of maximizing the algebraic expression over all possible transmitted symbols when an approximation is used.

6. The method of claim 3 wherein the step of deriving the reliability information from the algebraic expression when an approximation is not used comprises the step of taking a logarithm of a sum, over all possible transmitted symbols, of an exponential whose exponent is the algebraic expression.

7. The method of claim 3 wherein the step of evaluating an algebraic expression comprises the steps of:
    evaluating a set of products for all possible transmitted symbols from received first and second samples for each of the $N_a$ receiving devices;
    evaluating a set of sums from the set of products for all $N_a$ receiving devices; and adding a priori information to the set of sums resulting in the algebraic expression.

8. The method of claim 7 wherein the step of deriving the reliability information comprises the step of maximizing the algebraic expression over all possible transmitted symbols when an approximation is used.

9. The method of claim 7 wherein the step of deriving the reliability information when an approximation is not used comprises the step of taking a logarithm of a sum, over all possible transmitted symbols, of an exponential whose exponent is the algebraic expression.

10. The method of claim 1 wherein the transmitted symbols are generated by a nonconstant envelope modulator.

11. The method of claim 10 wherein the step of receiving a first sample and a second sample comprises the step of:
    receiving first and second samples for each of $N_a$ receiving devices where $N_a$ is an integer equal to or greater than 1.

12. The method of claim 11 wherein the step of evaluating an algebraic expression comprises the steps of:
    evaluating a set of difference expressions for all possible transmitted symbols from received first samples for each of the $N_a$ receiving devices;
    evaluating a set of sums from the set of difference expressions for all $N_a$ receiving devices; and
    adding a priori information to the set of sums resulting in the algebraic expression.

13. The method of claim 11 wherein the step of deriving the reliability from the algebraic expression comprises the step of minimizing the algebraic expression over all possible transmitted symbols when an approximation is used.

14. The method of claim 11 wherein the step of deriving the reliability information from the algebraic expression when an approximation is not used comprises the step of taking a logarithm of a sum, over all possible transmitted symbols, of an exponential whose exponent is the algebraic expression.

15. The method of claim 11 wherein the step of evaluating an algebraic expression comprises the steps of:
  evaluating a set of difference expressions for all possible transmitted symbols from received first and second samples for each of the $N_a$ receiving devices;
  evaluating a set of sums from the set of difference expressions for all $N_a$ receiving devices; and
  adding a priori information to the set of sums resulting in the algebraic expression.

16. The method of claim 15 wherein the step of deriving the reliability information comprises the step of minimizing the algebraic expression over all possible transmitted symbols when an approximation is used.

17. The method of claim 15 wherein the step of deriving the reliability information when an approximation is not used comprises the step of taking a logarithm of a sum, over all possible transmitted symbols, of an exponential whose exponent is the algebraic expression.

18. The method of claim 1, wherein the set of algebraic expressions employed by step (c) comprises:
  for a constant and memoryless modulator case:

$$\Omega_{m,i}(b) \cong \max_{x_m \in X(d_{m,i})} \left\{ \sum_{a=0}^{N_a-1} \left( \frac{Re\{y_{a,m} h^*_{a,m} x^*_m\}}{\sigma_a^2} \right) + \sum_{l=0}^{N-1} (\ln P(d_{m,l})) \right\} \quad (i)$$

$$\Omega_{m,i}(b) = \ln \sum_{x_m \in X(d_{m,i})} \left( e^{\sum_{a=0}^{N_a-1} \left( \frac{Re\{y_{a,m} h^*_{a,m} x^*_m\}}{\sigma_a^2} \right) + \sum_{l=0}^{N-1} (\ln P(d_{m,l}))} \right); \quad (ii)$$

for a constant and non-memoryless modulator case:

$$\Omega_{m,i}(b) \cong \max_{x^m_{m-1} \in X^m_{m-1}(d_{m,i})} \left\{ \sum_{a=0}^{N_a-1} \sum_{k=m-1}^{m} \left( \frac{Re\{y_{a,k} h^*_{a,k} x^*_k\}}{\sigma_a^2} \right) + \sum_{l=0}^{N-1} (\ln P(d_{m,l})) \right\} \quad (iii)$$

$$\Omega_{m,i}(b) = \ln \sum_{x^m_{m-1} \in X^m_{m-1}(d_{m,i})} \left( e^{\sum_{a=0}^{N_a-1} \sum_{k=m-1}^{m} \left( \frac{Re\{y_{a,m} h^*_{a,m} x^*_m\}}{\sigma_a^2} \right) + \sum_{l=0}^{N-1} (\ln P(d_{m,l}))} \right); \quad (iv)$$

for a non-constant and memoryless modulator case:

$$\Omega_{m,i}(b) \cong -\min_{x_m \in X(d_{m,i})} \left\{ \sum_{a=0}^{N_a-1} \left( \frac{|y_{a,m} - h_{a,m} x_m|^2}{2\sigma_a^2} \right) - \sum_{l=0}^{N-1} (\ln P(d_{m,l})) \right\} \quad (v)$$

$$\Omega_{m,i}(b) = \ln \sum_{x_m \in X(d_{m,i})} \left( e^{\sum_{a=0}^{N_a-1} \left( \frac{-|y_{a,m} - h_{a,m} x_m|^2}{2\sigma_a^2} \right)} e^{\sum_{l=0}^{N-1} (\ln P(d_{m,l}))} \right); \quad (vi)$$

and for a non-constant and non-memoryless modulator case:

$$\Omega_{m,i}(b) \cong -\min_{x^m_{m-1} \in X^m_{m-1}(d_{m,i})} \left\{ \sum_{a=0}^{N_a-1} \left( \frac{|y_{a,m} - h_{a,m} x_m|^2}{2\sigma_a^2} \right) - \sum_{l=0}^{N-1} (\ln P(d_{m,l})) \right\} \quad (vii)$$

$$\Omega_{m,i}(b) = \ln \sum_{x^m_{m-1} \in X^m_{m-1}(d_{m,i})} \left( e^{\sum_{a=0}^{N_a-1} \left( \frac{-|y_{a,m} - h_{a,m} x_m|^2}{2\sigma_a^2} \right) + \sum_{l=0}^{N-1} (\ln P(d_{m,l}))} \right), \quad (viii)$$

where the first and second samples are from a channel having characteristic $\underline{\underline{h}}$ and noise $\underline{\underline{n}}$ with $N_a$ receiving devices and $\Omega_{m,i}(b)$ is the reliability information for the $i_{th}$ bit at the $m^{th}$ time interval wherein $h_{a,m}$ is a distortion element; $x_m$ is a transmitted symbol; $y_{a,m}$ is a received sample $\sigma_a$ is related to noise variance; $d_{m,l}$ is an input bit to the modulator that produces the transistion from symbol $x_{m-l}$ to symbol $x_m$; $X(d_{m,i})$ is a set of all possible transmitted symbols at time m having bit $d_{m,i}$=b; and $X^m_{m-1}(d_{m,i})$ is a set of all possible sequences $x^m_{m-1}(d_{m,i})$ having bit $d_{m,i}$=b.

19. A method for calculating reliability information, the method comprises the steps of:
  receiving a first sample and a second sample derived from transmitted symbols for each of $N_a$ receiving devices, where $N_a$ is an integer equal to or greater than 1;
  evaluating an algebraic expression from the samples and from a priori information including the steps of:
   1) evaluating a set of products for all possible transmitted symbols from received first and second samples for each of the $N_a$ receiving devices,
   2) evaluating a set of sums from the set of products for all $N_a$ receiving devices, and
   3) adding a priori information to the set of sums resulting in the algebraic expression; and deriving the reliability information from the algebraic expression, wherein, when an approximation is not used, comprises the step of taking a logarithm of a sum, over all possible transmitted symbols, of an exponential whose exponent is the algebraic expression.

20. A method for calculating reliability information, the method comprises the steps of:
  receiving a first sample and a second sample i) for each of $N_a$ receiving devices, where $N_a$ is an integer equal to or greater than 1 and ii) derived from transmitted symbols generated by a nonconstant envelope modulator;
  evaluating an algebraic expression from the samples and from a priori information including the steps of:
   1) evaluating a set of difference expressions for all possible transmitted symbols from received first and second samples for each of the $N_a$ receiving devices, 2) evaluating a set of sums from the set of difference expressions for all $N_a$ receiving devices, and
3) adding a priori information to the set of sums resulting in the algebraic expression; and deriving the reliability information from the algebraic expression, wherein, when an approximation is not used, comprises the step of taking a logarithm of a sum, over all possible transmitted symbols, of an exponential whose exponent is the algebraic expression.

\* \* \* \* \*